United States Patent [19]
Beehler

[11] 4,390,219
[45] Jun. 28, 1983

[54] TERMINAL BLOCK AND CAPACITOR MOUNT FOR BLOWER

[75] Inventor: Richard F. Beehler, Williamson County, Tenn.

[73] Assignee: Heil-Quaker Corporation, Lewisburg, Tenn.

[21] Appl. No.: 244,159

[22] Filed: Mar. 16, 1981

[51] Int. Cl.³ .......................... H01R 4/66; H02K 11/00
[52] U.S. Cl. .................................... 339/14 R; 310/71; 339/147 R
[58] Field of Search ............. 339/198 K, 126 R, 14 R, 339/147 R, 75 T; 310/71, 72

[56] References Cited

U.S. PATENT DOCUMENTS

| | | | |
|---|---|---|---|
| 2,955,235 | 10/1960 | Ruscito et al. | 317/99 |
| 3,408,617 | 10/1968 | Broyles | 339/126 |
| 3,586,910 | 6/1971 | Sauber | 317/13 |
| 3,707,697 | 12/1972 | Izumi | 339/14 R |
| 4,035,610 | 7/1977 | Roth | 219/366 |
| 4,098,547 | 7/1978 | Wrobel | 339/91 R |
| 4,160,576 | 7/1979 | Vettori | 339/119 R |
| 4,161,622 | 7/1979 | Drayer et al. | 174/152 R |
| 4,205,891 | 6/1980 | Rieman | 339/126 R |
| 4,339,231 | 7/1982 | Conery et al. | 310/71 X |

FOREIGN PATENT DOCUMENTS 55-68862  5/1980  Japan ...................................... 310/71

*Primary Examiner*—Eugene F. Desmond
*Attorney, Agent, or Firm*—Wood, Dalton, Phillips, Mason & Rowe

[57] ABSTRACT

A terminal block and capacitor mount for use in an apparatus, such as a blower, having a drive motor. The terminal block is arranged to provide connections to the windings of the motor and to a capacitor secured to the terminal block. The assembly is arranged to be mounted to a support wall associated with the blower. Terminals are exposed through opposite faces of the housing of the assembly. The housing is secured to the support wall with one face exposed through the support wall opening to permit connection to the terminals therethrough. In the illustrated embodiment, the terminals to which the motor supply leads and power supply leads are connected are exposed through the support wall opening. Grounding straps are provided for grounding the capacitor case to the support wall as a result of the mounting of the capacitor to the assembly. The assembly permits the use of any one of a plurality of different size motors with any one of a plurality of different size capacitors through suitable connection to the terminals thereof.

18 Claims, 6 Drawing Figures

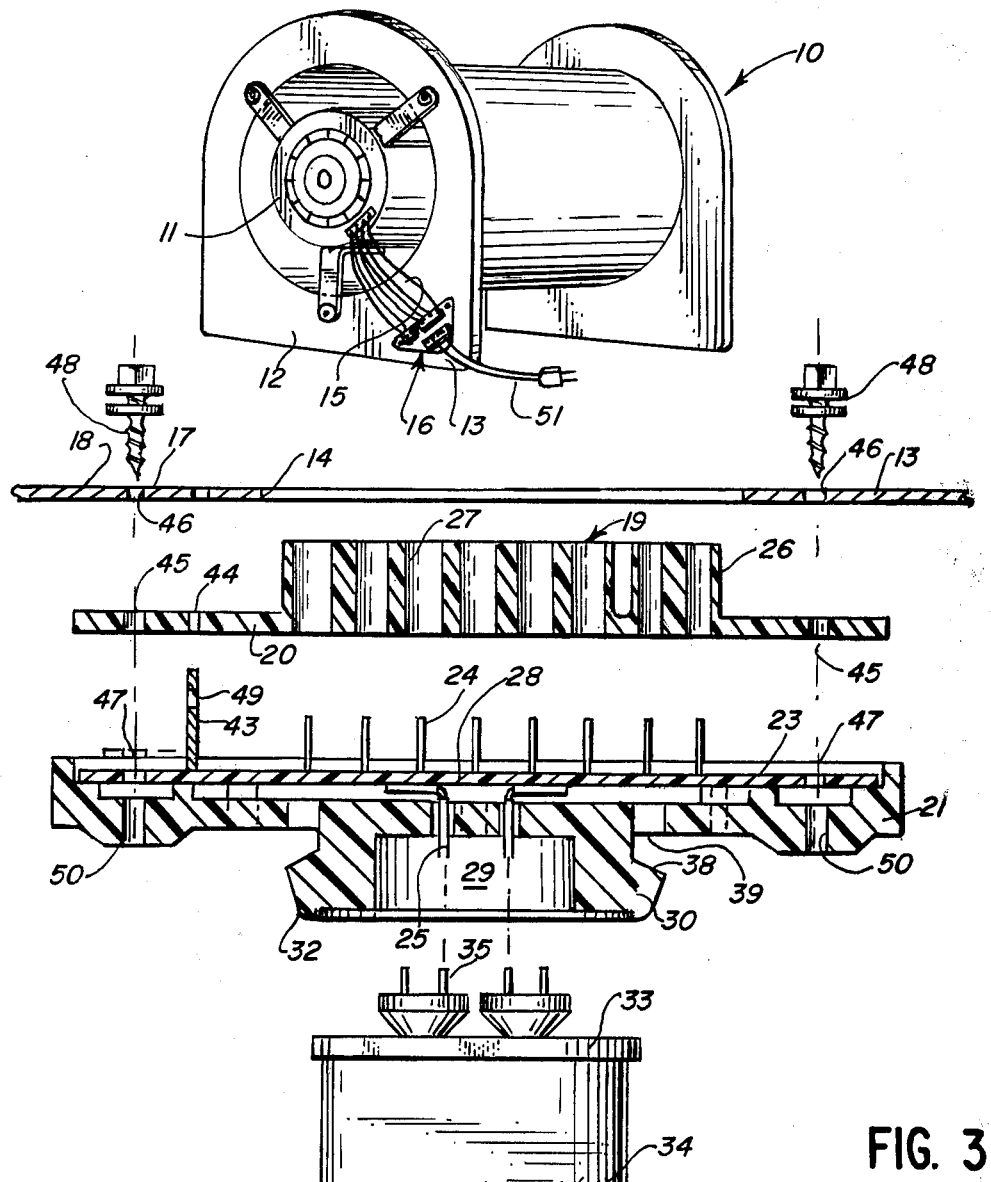

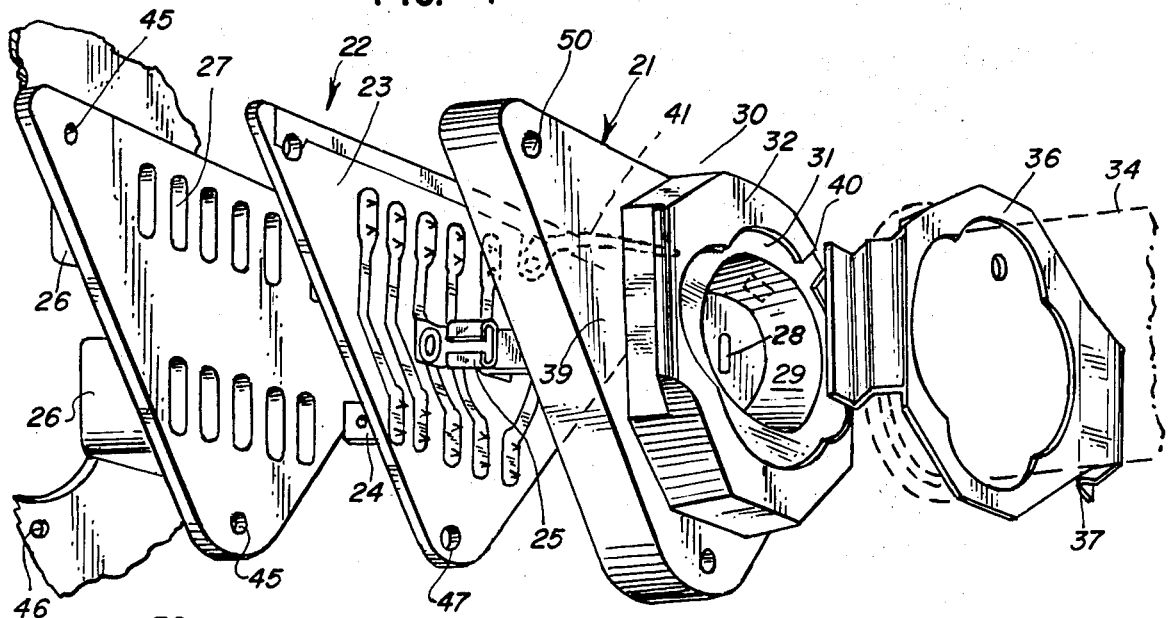
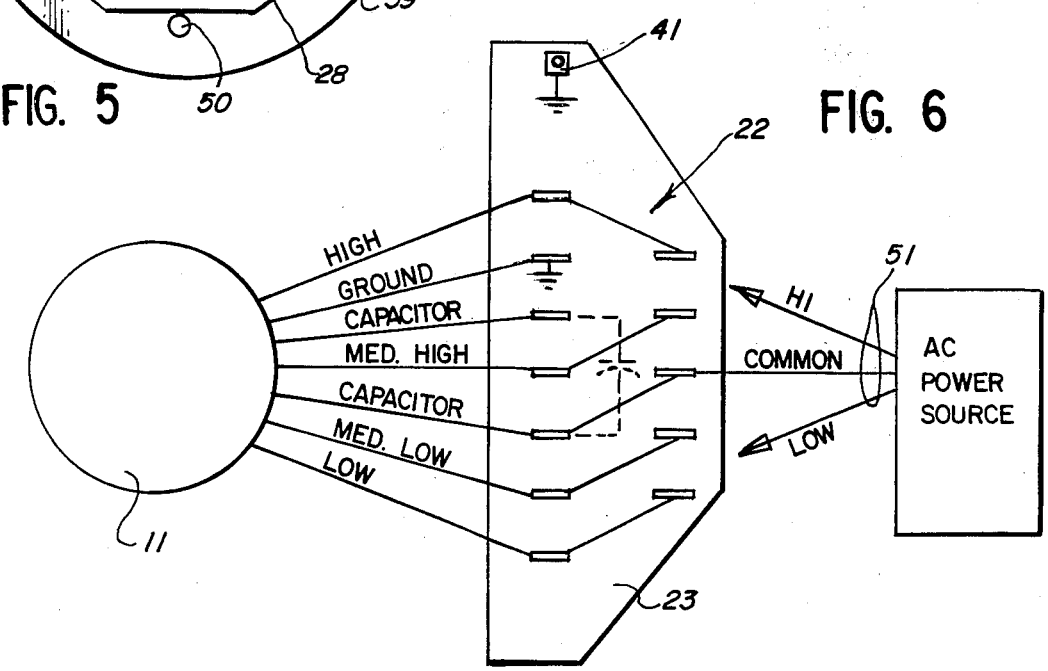

TERMINAL BLOCK AND CAPACITOR MOUNT FOR BLOWER

BACKGROUND OF THE INVENTION

1. Field of the Invention

This invention relates to electrical connection means and in particular to means for providing various electrical connections between the motor, motor capacitor, and power source of an apparatus such as a blower.

2. Description of the Background Art

In apparatus such as fans and blowers, multiple speed motors are utilized for driving the apparatus at different speeds, such as high and low speeds. In such apparatus, it is desirable to provide for interchangeability of blower and motor sizes permitting the use of a minimum number of different structural elements. A problem arises in the use of different size motors in that the motors normally require the association therewith of suitable capacitors which correspondingly have different sizes.

A number of devices have been developed for use in connecting different wiring devices in such apparatus. Illustratively, in U.S. Pat. No. 3,707,697 of John Izumi, an electrical connecting and mounting frame is shown for use in electrical wiring systems wherein wiring devices, such as AC outlets, switches and pilot lights are releasably mounted to an insulating support block and simultaneously electrically connected to different conductors in the block. The block further includes means for grounding certain wires thereof.

Willis E. Rieman et al., in U.S. Pat. No. 4,205,891, show a radio frequency interference suppressor connector having a built-in capacitor for suppressing generation of high frequency energy from being radiated through power supply wires associated therewith. The connector includes a housing adapted to be mounted on a conductive case of the apparatus. An electrically conductive member is exposed to the outside of the housing for detachable connection thereto of a movable connector, with the opposite end of the conductive member being arranged for connection to the electrical apparatus. The housing defines a cavity having mid-portions of the conductive member extending along one wall thereof. The capacitor is positioned in the cavity with one terminal connected to the conductive member and the other terminal engaging a second conductive member having a portion extending outside of the fixed housing and adapted to engage the case of the apparatus.

Other mounting structures are illustrated in U.S. Pat. Nos. 2,955,235 of Anthony J. Riscito et al.; 3,408,617 of Wayne E. Broyles; 3,586,910 of Rudolph Stuart Sauber; 4,035,610 of James E. Roth; 4,098,547 of Gunter Wrobel; 4,160,576 of Claude Vettori; and 4,161,622 of Sanford A. Drayer et al. These patents illustrate different structures for mounting electrical components in association with electrical apparatus and for providing electrical terminal connections therebetween.

SUMMARY OF THE INVENTION

The present invention comprehends an improved terminal block and capacitor mount assembly for use in an apparatus having means for mounting any one of a plurality of different size electric drive motors. The apparatus includes a blower housing wall adjacent the motor for mounting the terminal block and capacitor mount assembly thereto.

A portion of the blower housing wall defines a front face, a rear face, and a through opening. The assembly includes a terminal block housing having a front portion and a rear portion. Means are provided for mounting the terminal block assembly to one face of the support wall, with one portion of the housing exposed rearwardly thereof and the other portion exposed to the opening for access to terminals carried on a circuit board in the housing.

The assembly further includes means for removably securing any one of a plurality of different size capacitors to the rear portion of the housing. The terminals in the illustrated embodiment exposed through the support wall opening are arranged to have electrical connection to the windings of the motor mounted in the apparatus and to a power supply for energizing the motor. The rearwardly exposed terminals are arranged to have electrical connection with the selected capacitor. Circuit means, which in the illustrated embodiment may comprise a circuit board, is carried within the housing for interconnecting the various terminals.

One wall of the housing defines a capacitor mount. The capacitor is removably secured thereto by suitable securing means. In the illustrated embodiment, the securing means comprises a clip having spring fingers adapted to releasably engage shoulders on the mount portion of the housing.

The mount portion may include a recess adapted to receive the end of the capacitor for improved securing of the capacitor to the housing.

The circuit means may include grounding strap portions extending outwardly through the housing. One of the grounding strap portions may extend into overlying relationship to the mount so as to engage the case of the capacitor when the capacitor is secured to the housing.

The other of the grounding straps may be arranged to be engaged with the support wall as a result of the securing of the housing to the support wall.

The terminal block and capacitor mount assembly of the present invention is of extremely simple and economical construction while yet providing improved facilitated electrical connection of windings of different size electric motors and corresponding different size capacitors in apparatuses such as blowers.

BRIEF DESCRIPTION OF THE DRAWING

Other features and advantages of the invention will be apparent from the following description taken in connection with the accompanying drawing wherein:

FIG. 1 is a perspective view of a blower having a terminal block and capacitor mount assembly embodying the invention;

FIG. 2 is an exploded view of the assembly with portions thereof shown in section;

FIG. 3 is a fragmentary section illustrating the connected arrangement of the capacitor to the capacitor mount of the assembly;

FIG. 4 is an exploded perspective view of the assembly;

FIG. 5 is a fragmentary elevation of the rear portion of the assembly for connection of the capacitor thereto; and FIG. 6 is a schematic electrical wiring diagram of the apparatus.

DESCRIPTION OF THE PREFERRED EMBODIMENT

In the exemplary embodiment of the invention as disclosed in the drawing, a blower apparatus generally designated 10 having a multiple speed electric drive motor 11 is shown to include a conventional metal blower housing having an end wall 12 mounting the motor 11.

The housing end wall defines a mounting portion 13 provided with an opening 14. Opening 14 is disposed adjacent the motor 11 to permit relatively short motor leads 15 to be extended from the motor to adjacent the opening.

The invention comprehends the provision of an improved terminal block and capacitor mount assembly 16 to the housing end wall portion 13. As illustrated in FIG. 2, the end wall portion 13 defines a front face 17 and a rear face 18.

Assembly 16 includes an electrically insulating housing generally designated 19 defined by a front portion 20 and a rear portion 21. By way of example, housing 19 may be formed by injection molding of a suitable plastic, such as polypropylene or nylon. Circuit means generally designated 22 are provided within the housing, and in the illustrated embodiment, comprise a printed circuit board 23 having a first plurality of terminals 24 extending forwardly therefrom and a second plurality of terminals 25 extending rearwardly therefrom. Housing portion 20 is provided with a forwardly projecting terminal enclosure portion 26 defining a plurality of through openings 27 through which the terminals 24 are accessible from forwardly of the housing. The rear portion 21 is provided with suitable openings 28 for passing of the terminals 25 therethrough into a rearwardly opening wall 29 defined by a rearwardly projecting annular wall 30 defining a capacitor mount portion of the rear housing portion 21.

Wall 30 further defines a stepped shoulder 31 recessed in the rear distal surface 32 thereof for receiving the end 33 of a capacitor 34. The capacitor is provided with terminals 35 adapted to be electrically connected to the terminals 25 as a result of the urging of the capacitor forwardly to bring end 33 into the recessed shoulder portion 31 of the mounting wall 30.

The capacitor is releasably secured to the mount 30 by an annular clip 36 having opposed spring fingers 37 resiliently retained against a laterally extending shoulder 38 on the wall 30 spaced rearwardly of the central portion 39 of the rear housing portion 21. In the illustrated embodiment, terminals 25 comprise female terminals and terminals 35 comprise male terminals adapted to be received in terminals 25 in electrical connected association therewith. Terminals 24, as shown in FIG. 2, comprise conventional spade terminals.

As further shown in FIG. 4, the rear surface 32 of the mount wall 30 further defines a notch 40 opening to shoulder 31. Circuit board 23 is provided with a rearwardly projecting grounding strap 41 which extends through a suitable opening 42 in rear wall portion 39 adjacent wall 30. The grounding strap is bent to extend through notch 40 so as to be engaged by the capacitor housing end 33 in the installed arrangement of the capacitor, thereby providing a ground connection to the circuit means 22 automatically as a result of the mounting of the capacitor to the assembly 16.

As further shown in FIG. 2, the circuit board further includes a forwardly extending grounding strap 43 extending through an opening 44 in the front housing portion 20. The distal end of the grounding strap is bent after being passed through the opening 44 so as to overlie one of a plurality of screw openings 45 in the front wall. As further shown in FIG. 2, support wall portion 13 is provided with suitable screw openings 46 and terminal board 23 is provided with corresponding similar screw openings 47 aligned with openings 45. Securing screws 48 are provided for securing the assembly to the end wall portion 13. Thus, as shown in FIG. 2, the screws 48 may comprise self-tapping screws having the shank thereof extended rearwardly successively through openings 46, 45 and 45 to be threaded into the rear housing portion 21. Mounting strap 43 includes an opening 49 which is aligned with opening 45 when the grounding strap is bent into engagement with the front surface of the housing portion 20, permitting the screw 48 to pass through opening 49 and cause desired electrical contact engagement between the grounding strap 43 and the end wall 13. As shown, the housing portion 21 is provided with suitable screw openings 50 to which the screws 48 are threaded in securing the assembly 16 to the support wall.

As indicated briefly above, the circuit means 22 is arranged to permit facilitated connection of the winding leads of motor 11 to the power supply leads 51 and to the capacitor 34 in providing the desired control of the blower motor. The means of assembly 16 permit selective mounting of any one of different size ($\mu f$) capacitors 34 suitable for use with the selected one of the different size motors 11 utilized in the blower apparatus 10. As discussed above, terminals 24 are conventional spade terminals and permit facilitated standard connection of the motor and power supply leads thereto. The plug-in terminal arrangement effectively simplifies manufacture and servicing. The assembly provides automatic grounding of the capacitor for safety. As indicated above, the grounding of the capacitor case is effected automatically as a result of the installation of the capacitor on the assembly 16 and the mounting of the assembly to the support wall 13 by the screws 48.

The foregoing disclosure of specific embodiments is illustrative of the broad inventive concepts comprehended by the invention.

Having described the invention, the embodiments of the invention in which an exclusive property or privilege is claimed are defined as follows:

1. A terminal block and capacitor mount assembly for use with a blower apparatus having an electric drive motor, comprising:
    a blower housing wall having means defining a face portion and a through opening in said face portion;
    terminal block housing means defining a front portion and a rear portion;
    means for mounting said terminal block housing to said face portion of said blower housing wall with one of said front and rear housing portions being exposed through said opening;
    means for removably securing any one of a plurality of different capacitors to said rear housing portion to extend away from said blower housing wall face portion; and
    circuit means within said housing means and having terminals exposed through said front and rear housing portions for providing selective interconnection between the windings of the motor mounted in said blower apparatus, a selected corresponding secured capacitor, and a power supply for energizing the motor.

2. The assembly of claim 1 wherein said rear housing portion includes a capacitor mount projecting outwardly therefrom, said capacitor securing means comprising means for securing the capacitor to said mount.

3. The assembly of claim 1 wherein said rear housing portion includes a capacitor mount projecting outwardly therefrom, said capacitor securing means comprising a retainer having spring fingers engaging said mount for securing the capacitor to said mount.

4. The assembly of claim 1 wherein said circuit means comprises a printed circuit board, said terminals being mounted thereto for exposure through said housing portions.

5. The assembly of claim 1 wherein said circuit means comprises a printed circuit board, said terminals being mounted thereto for exposure through said housing portions, at least one of said terminals extending outwardly from the housing.

6. The assembly of claim 1 wherein said circuit means comprises a printed circuit board, said terminals being mounted thereto for exposure through said housing portions, one of said terminals extending outwardly from said rear portion of the housing for connection of the capacitor thereto.

7. The assembly of claim 1 wherein said circuit means includes a grounding strap extending outwardly through said housing rear portion for engagement by a capacitor secured to said rear portion.

8. The assembly of claim 1 wherein said circuit means comprises a printed circuit board and said housing defines means for retaining said board.

9. An electrical connector and mount for a motor capacitor having an end wall and terminals projecting from the end wall, comprising:
electrically insulating wall means defining an outwardly opening well, and laterally projecting securing shoulder; and
a clip having an annular force-applying portion for engaging the capacitor, and a spring portion for resiliently releasable interlocked association with said securing shoulders, said force-applying portion comprising means for urging the capacitor end wall against the wall means with the terminals thereof received in said well as a result of the spring fingers being resiliently interlocked with said securing shoulders.

10. The connector and mount of claim 9 wherein said wall means defines a recessed, outwardly facing shoulder within which the capacitor end wall seats in the mounted arrangement.

11. The connector and mount of claim 9 wherein said securing shoulders extend oppositely laterally away from the well.

12. The connector and mount of claim 9 wherein said mount includes terminal means in said well disposed for direct electrical connection with the capacitor terminals in the mounted arrangement of the capacitor and arranged to further receive electrical connections from a motor.

13. The connector and mount of claim 9 wherein said mount includes a grounding terminal overlying said wall means to be engaged by the capacitor end wall in the mounted arrangement of the capacitor.

14. The connector and mount of claim 9 wherein said wall means defines a recessed, outwardly facing shoulder within which the capacitor end wall seats in the mounted arrangement, and said mount includes a grounding terminal overlying said recessed shoulder to be engaged by the capacitor end wall in the mounted arrangement of the capacitor.

15. The connector and mount of claim 9 wherein said wall means defines an outer notch, said mount further including a grounding terminal extending through said notch for engagement by the capacitor end wall in the mounted arrangement of the capacitor.

16. A terminal block and capacitor mount assembly for use with a blower apparatus having an electric drive motor energized from a power source and having a grounded metal blower housing including a generally planar wall portion, said assembly comprising:
means defining an opening in said blower housing wall portion;
a terminal block housing formed of electrically insulating material and having a front portion and a rear portion;
means for mounting said terminal block housing to said blower housing wall portion, with at least a portion of said front housing portion being exposed through said opening;
a first set of terminals disposed within said terminal block and accessible through said front housing portion;
a second set of terminals disposed within said terminal block and accessible through said rear housing portion;
means for releasably mounting a motor capacitor to said rear housing portion, whereby said capacitor is electrically connected to said second set of terminals automatically as an incident of its being mounted to said rear housing portion; and
circuit means disposed within said terminal block housing and arranged to:
(a) permit selective interconnection between said motor and said power source via said first set of terminals;
(b) effect electrical connection of said motor capacitor to said motor; and,
(c) effect a ground connection between said capacitor and said blower housing wall portion.

17. The assembly of claim 16 wherein said circuit means comprises a printed circuit board and said first and second terminal sets are mounted thereto.

18. The assembly of claim 16 wherein said motor capacitor has a conductive case and said circuit means includes a first grounding strap that overlies a portion of said rear housing portion for contact with said conductive case when said capacitor is mounted to said terminal block housing and a second grounding strap that overlies a portion of said front housing portion for contact with said blower housing wall portion.

* * * * *